US006751204B1

(12) United States Patent
Foti et al.

(10) Patent No.: US 6,751,204 B1
(45) Date of Patent: Jun. 15, 2004

(54) CALL ROUTING METHOD FOR 3G.IP NETWORKS

(75) Inventors: George Foti, Dollard des Ormeaux (CA); Sorin Surdila, Laval (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 681 days.

(21) Appl. No.: 09/610,048

(22) Filed: Jul. 5, 2000

(51) Int. Cl.[7] ............................................. H04L 12/66
(52) U.S. Cl. ....................... 370/328; 370/331; 370/467; 455/445
(58) Field of Search ................................. 370/323, 331, 370/355, 373, 389, 392, 401, 328, 352, 467; 455/433, 445

(56) References Cited

U.S. PATENT DOCUMENTS

| 5,325,362 A | * | 6/1994 | Aziz ............................ 370/405 |
| 5,867,494 A | * | 2/1999 | Krishnaswamy et al. ... 370/352 |
| 6,006,094 A | * | 12/1999 | Lee ............................. 455/445 |
| 6,097,948 A | * | 8/2000 | Sjodin ....................... 455/426.1 |
| 6,314,284 B1 | * | 11/2001 | Patel et al. .................. 455/417 |
| 6,526,033 B1 | * | 2/2003 | Wang et al. ................. 370/338 |

FOREIGN PATENT DOCUMENTS

| EP | 0 924 914 A2 | * | 10/1998 | ........... H04L/29/06 |
| WO | WO 98/11752 | | 3/1998 | |
| WO | WO 98/43446 | * | 10/1998 | |
| WO | WO 00/07403 | | 2/2000 | |
| WO | WO 00/33600 | | 6/2000 | |
| WO | WO 00/42761 | | 7/2000 | |
| WO | WO 02/13567 A1 | * | 2/2002 | ........... H04Q/7/38 |

OTHER PUBLICATIONS

Huitema, Christian et al., "An Architecture for Residential Internet Telephony Service", May/Jun. 1999, IEEE Network, p. 52.*

* cited by examiner

*Primary Examiner*—Kenneth Vanderpuye
*Assistant Examiner*—Joshua Kading
(74) *Attorney, Agent, or Firm*—Smith & Danamraj, P.C.

(57) ABSTRACT

A method in a 3G.IP network of routing a call from an originating subscriber in an originating network to a mobile terminating subscriber roaming in a visited network, the mobile terminating subscriber having a home network that maintains location information for the mobile terminating subscriber. When the originating subscriber sends a call origination message to a gatekeeper in the originating network, the gatekeeper obtains location information from the home network for the mobile terminating subscriber. An IP address of a media gateway in the visited network (MGW1) is then obtained and provided to a media gateway in the originating network (MGW2). The IP address of MGW2 is then sent to the originating subscriber. Thereafter, the call is routed from the originating subscriber through MGW2 in the originating network directly to MGW1 in the visited network. An MSC Server in the visited network then routes the call to the mobile terminating subscriber.

4 Claims, 4 Drawing Sheets

CALL ROUTING METHOD FOR 3G.IP NETWORKS

BACKGROUND OF THE INVENTION

1. Technical Field of the Invention

This invention relates to telecommunication systems and, more particularly, to a method of routing calls in third generation Internet Protocol (3G.IP) networks.

2. Description of Related Art

In second generation. (2G) circuit-switched networks today, calls to a mobile subscriber roaming in a visited network are forced by the characteristics of 2G networks to follow a voice transmission path which is not efficient. Calls to the mobile subscriber must be delivered first to the subscriber's home network, and then to the visited network, regardless of where the subscriber is roaming. This procedure can sometimes lead to very inefficient call routing.

For example, if a subscriber from Montreal roams to Dallas, and someone in Dallas calls him utilizing his Montreal telephone number, the call is routed to the subscriber's home network in Montreal and then back to the subscriber in Dallas. This occurs because number analysis in the caller's switch in Dallas recognizes the 514 prefix for Montreal, and directs the switch to deliver the call as a Public Switched Telephone Network (PSTN) call towards Montreal. The call is received in Montreal by a Gateway Mobile Switching Center (G-MSC) that interrogates the Montreal Home Location Register (HLR) and gets back a routing number such as a Temporary Location Directory Number (TLDN) allocated by the Dallas MSC currently serving the roamer. Finally, the G-MSC routes the call back to Dallas based on the TLDN analysis. The result of this routing is that instead of being routed as a local Dallas call, the call involves two long-distance trunks between Dallas and Montreal.

As noted above, there are characteristics (or constraints) of the 2G networks which force the call to follow an inefficient voice transmission path. The first constraint is related to the circuit-switched transport of the voice information and signaling. A voice trunk is seized between the caller and the called party, and remains dedicated to carrying the voice information for the duration of the call. The call control signaling, even though it does not follow the same physical path as the voice, is also bound to the configuration of the circuit-switched network. For example, even though the Integrated Services User Part/Signaling System 7 (ISUP/SS7) signaling is delivered over the SS7 signaling infrastructure rather than the voice trunk, the signaling still has to reach the same switch where the voice trunk terminates. For example, if a call between Subscriber-A and Subscriber-B must cross a transit switch because of a particular circuit-switched configuration, then the ISUP/SS7 signaling must also cross the same transit switch.

The second constraint of 2G networks that causes inefficient routing is the North American number allocation process which does not make a distinction between landline and wireless subscribers. Because of this, in order to keep the switch routing tables throughout the network at a manageable size, the distinction between a landline subscriber and a wireless subscriber is made only in the home network of each particular subscriber. The G-MSC function discriminates a wireless subscriber number from a landline number and performs the HLR interrogation. Therefore the G-MSC functionality must always be performed in the home network.

This routing procedure has also been proposed for third generation all IP (3G.IP) networks. The introduction of 3G.IP networks will make one of the constraints disappear: the new 3G networks will replace the circuit-switched infrastructure with packet switched technology providing multiple connectionless transmission paths between the origin and the destination points. The subscriber number allocation constraint, however, is maintained. So even in 3G.IP networks, the subscriber's home network will be the only one that knows where the subscriber is roaming and what services are activated for the subscriber.

In order to overcome the disadvantage of existing solutions, it would be advantageous to have a method of efficiently routing calls in 3G.IP networks which, while continuing to perform the location interrogation by a Gateway functionality located in the home network, chooses an optimal path for the payload transport. The present invention provides such a method.

SUMMARY OF THE INVENTION

The present invention is an improved call routing method applicable to 3G.IP subscribers capable of performing voice and/or video calls, and requesting real-time characteristics such as multimedia sessions. For doing so, the subscriber makes use of the H.323 signaling protocol from the International Telecommunications Union (ITU) or the Session Initiation Protocol (SIP) signaling protocol from the Internet Engineering Task Force (IETF). The call routing method of the present invention enables 3G.IP network infrastructures to choose an optimal path for the payload transport while continuing to perform the location interrogation by a Gateway functionality located in the home network.

Thus, the present invention is a method in a 3G.IP network of routing a call from an originating subscriber in an originating network to a mobile terminating subscriber roaming in a visited network, the mobile terminating subscriber having a home network that maintains location information for the mobile terminating subscriber. The method begins when the originating subscriber sends a call origination message to a gatekeeper in the originating network. The gatekeeper then obtains from the home network, location information for the mobile terminating subscriber in the visited network. This is followed by sending an IP address for a node in the visited network to the originating network, and routing the call directly from the originating network to the visited network.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The invention is an improved call routing method applicable to 3G.IP subscribers. A 3G.IP subscriber is a user who can perform voice and/or video calls, requesting real-time characteristics such as multimedia sessions. For doing so, the subscriber makes use of the H.323 or SIP signaling protocols. The call routing method of the present invention enables 3G.IP network infrastructures to choose the most optimal path for the payload transport while continuing to perform the location interrogation by a Gateway functionality located in the home network.

In 3G.IP networks, the HLR functionality is replaced by an enhanced functionality called a Home Subscriber Server (HSS). In addition, the call control for multimedia calls is no longer performed by an MSC but by a Call State Control Function (CSCF). The CSCF is, in fact, a generic term for either an H.323 Gatekeeper or a SIP server. For purposes of the exemplary embodiment described herein, the detailed description below describes the improved routing method utilizing the H.323 protocol.

The improved call routing method is explained using a call scenario in which an H.323 fixed subscriber calls a 3G.IP mobile terminating subscriber. This call scenario involves three networks: (1) an originating network where the H.323 fixed subscriber is located; (2) a home network of the called 3G.IP mobile subscriber; and (3) a visited network where the called 3G.IP mobile subscriber is currently roaming. To illustrate the merits of the invention, the inefficient call routing method inherited from the 2G legacy network is first described in FIGS. 1A and 1B, and then the efficient routing method of the present invention is described in FIGS. 2A and 2B.

Figure 1A:
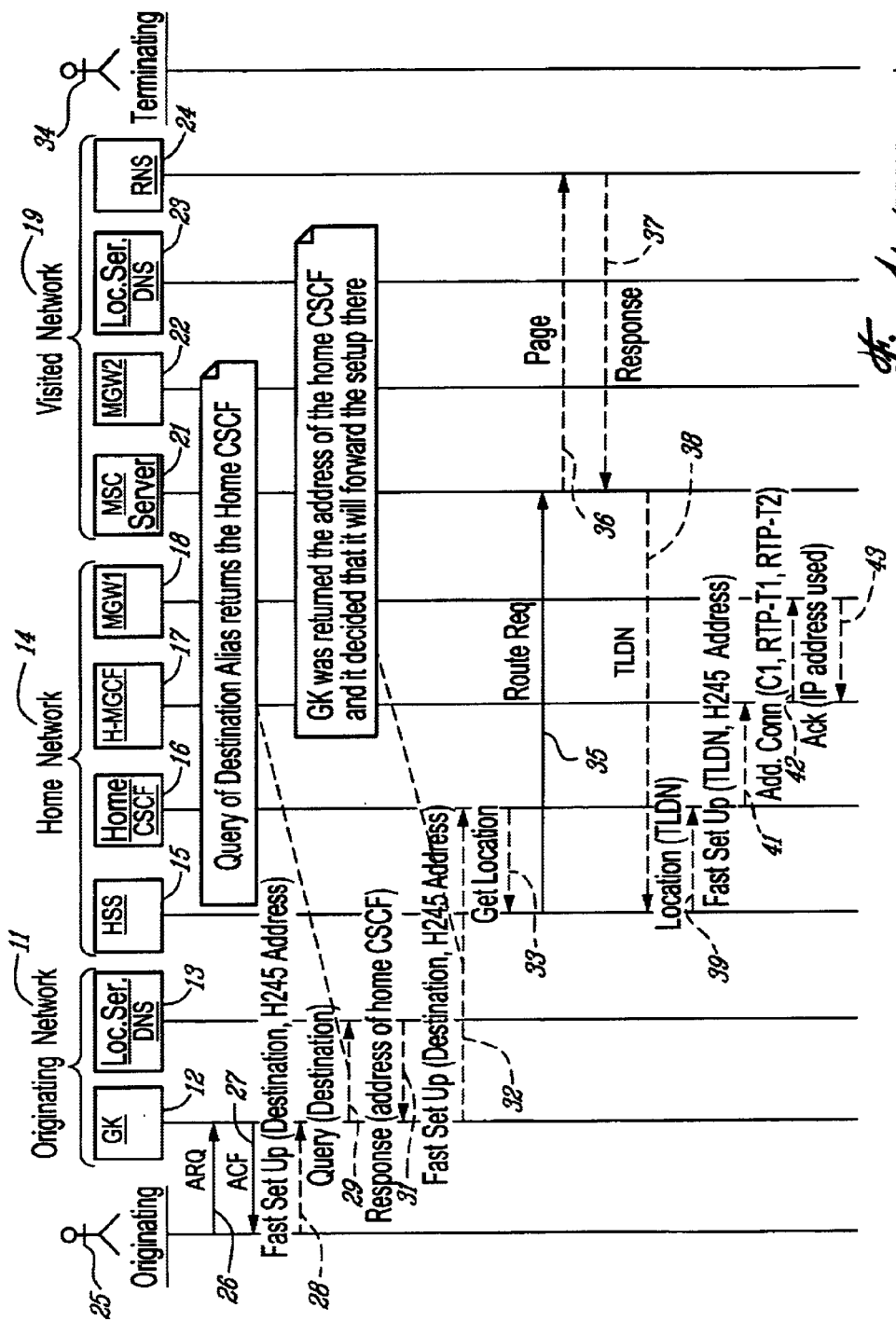
FIGS. 1A and 1B (Prior Art) are two parts of a signaling diagram illustrating the flow of messages when routing a call to a roaming mobile subscriber using the existing procedures.
Figure 1B:
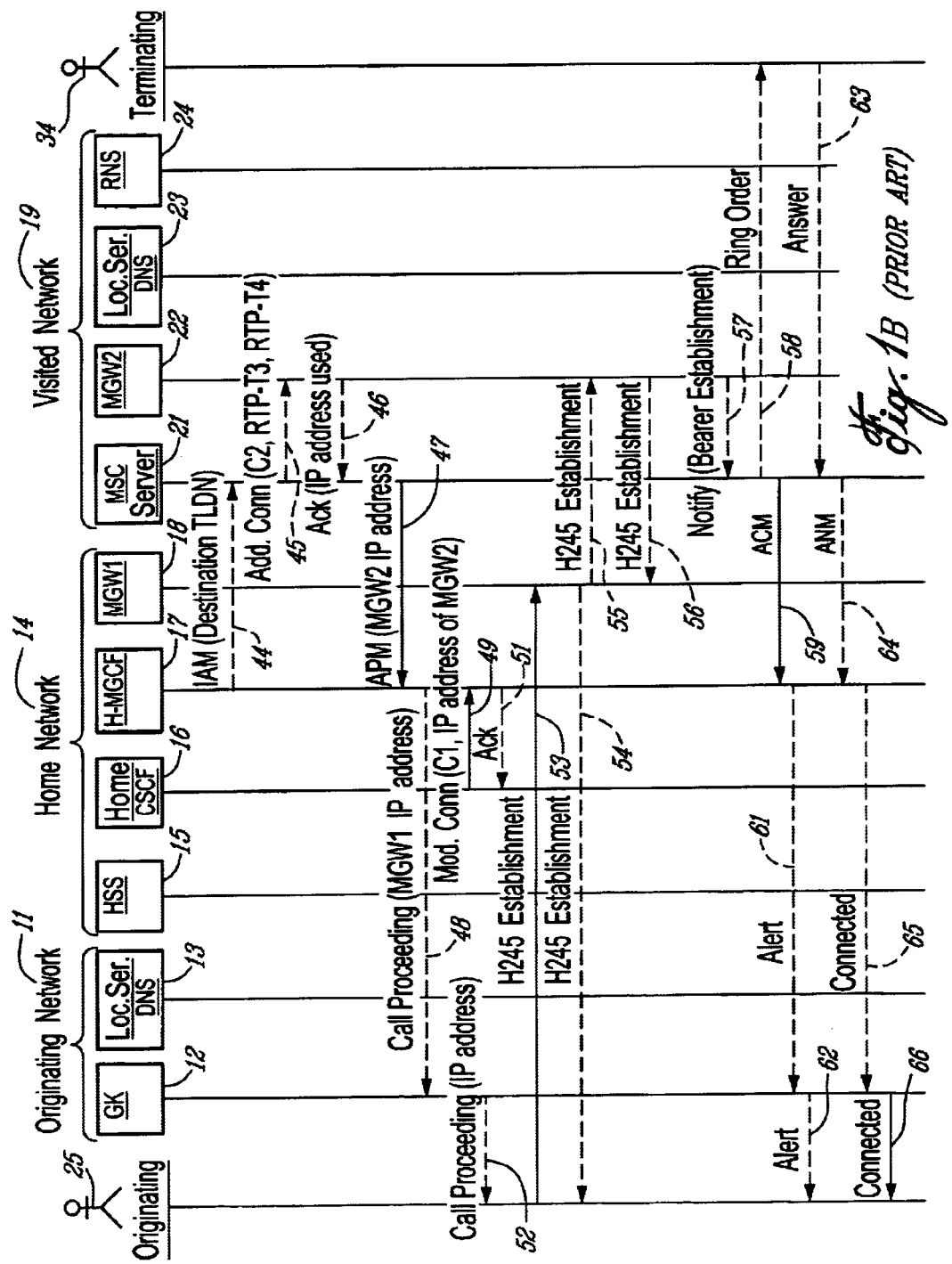

FIGS. 1A and 1B are two parts of a signaling diagram illustrating the flow of messages when routing a call to a roaming mobile subscriber using the existing procedures. An Originating Network 11 includes a Gatekeeper (GK) 12 and a Location Server—Domain Name Server (DNS) 13. A Home Network 14 includes a Home Subscriber Server (HSS) 15, a Home Call State Control Function (CSCF) 16, a Home Media Gateway Control Function (H-MGCF) 17, and a Home Media Gateway (MGW1) 18. A Visited Network 19 includes a Mobile Switching Center (MSC) Server 21, a Visited Media Gateway (MGW2) 22, a Location Server DNS 23, and a Radio Network Server (RNS) 24.

An originating subscriber 25 initiates a call by sending an Admission Request (ARQ) message 26 to the Gatekeeper 12 which returns an Admission Confirm (ACF) message 27 to the originating subscriber. The originating subscriber then sends a Fast Setup message 28 to the Gatekeeper. The Fast Setup message includes an identifier for the destination user (Destination Alias) and a destination media address (H.245 Address). At 29, the Gatekeeper sends a Query of the Destination Alias to the Location Server 13 in the Originating Network. This Query results in a Response to the Gatekeeper at 31 which indicates the address of the Home CSCF 16.

Since the address of the Home CSCF 16 was returned to the Gatekeeper 12, the Gatekeeper forwards the call setup to the Home CSCF in a Fast Setup message 32. At 33, the Home CSCF queries the HSS 15 to obtain location information for the called (terminating) subscriber 34. Therefore, the HSS sends a Routing Request (RouteReq) message 35 to the MSC Server 21 in the Visited Network 19. The MSC Server requests the RNS 24 to page for the terminating subscriber at 36. The RNS returns a response at 37 indicating whether or not the terminating subscriber is available. If the terminating subscriber is available, the MSC Server sends a RouteReq Return Result message 38, including a routing number such as a TLDN, to the HSS. At 39, the HSS sends the TLDN to the Home CSCF.

The Home CSCF 16 then sends a Fast Setup message 41, including the TLDN and the H.245 Address, to the H-MGCF 17. The H-MGCF responds by sending an Add Connection message 42 to the MGW1 18. The Add Connection message includes a first Context (C1) associating two media terminations, a first Real-time Transport Protocol Termination (RTP-T1), and a second RTP Termination (RTP-T2). These parameters are fully described in the H.248 standards. MGW1 then returns an Acknowledgment 43 with the IP address that it has selected to use for this particular session. The process then moves to FIG. 1B, where the Home Network 14 then begins to route the call to the Visited Network 19.

At 44, the H-MGCF 17 sends a call setup message such as an ISUP Initial Address Message (IAM), including the Destination Alias and the TLDN for the mobile terminating subscriber 34, to the MSC Server 21 in the Visited Network 19. The MSC Server responds by sending an Add Connection message 45 to the MGW2 22. The Add Connection message includes a second Context (C2), and a third and fourth RTP Termination (RTP-T3 and RTP-T4). MGW2 then returns an Acknowledgment 46 with the IP address selected for use with this session. The MSC Server then sends an Application Transport Message (APM) 47, including the IP address of MGW2 22, to the H-MGCF 17 in the Home Network 14. The H-MGCF sends a Call Proceeding message 48 to the Gatekeeper 12 with the IP address of MGW1 18. The H-MGCF also sends a Modify Connection message 49 to MGW1 with C1 and the IP address of MGW2. At 51, MGW1 acknowledges the Modify Connection message. At 52, the Gatekeeper sends a Call Proceeding message to the originating subscriber 25 with the IP address of MGW1.

This process results in the dissemination of IP addresses such that a call can be established from the originating subscriber 25 to the Home Network 14, and from there to the Visited Network 19. Thus, an H.245 Establishment message 53 is sent from the originating subscriber to MGW1 18 in the Home Network, and an Establishment Acknowledgment message 54 is returned to the originating subscriber. At 55, MGW1 sends an H.245 Establishment message to MGW2 22 in the Visited Network, and an Establishment Acknowledgment message 56 is returned to MGW1. At this point, MGW2 sends a Notify message 57 to the MSC Server 21 indicating that a bearer has been established.

The MSC Server 21 then sends a ring order 58 to the mobile terminating subscriber 34, and sends an ISUP Address Complete (ACM) message 59 to the H-MGCF 17 in the Home Network 14. The H-MGCF sends an Alert signal 61 to the Gatekeeper 12 which forwards the Alert signal at 62 to the originating subscriber 25. When the mobile terminating subscriber answers the ring order, an Answer signal 63 is sent to the MSC Server. The MSC Server sends an ISUP Answer Message (ANM) 64 to the H-MGCF. The H-MGCF then sends a Connected signal 65 to the Gatekeeper which forwards the Connected signal to the originating subscriber at 66.

Thus, in FIGS. 1A and 1B, it can be seen that the gateway function is performed by the H-CSCF 16, and the process results in inefficient call routing. By way of example, if the originating subscriber was located in Vancouver, while the terminating subscriber's home network was in Montreal, and the terminating subscriber was roaming in Seattle, the payload would be carried from the originating'subscriber's fixed H.323 terminal in Vancouver to MGW1 in Montreal, and finally through MGW2 in Seattle to the mobile terminating subscriber. So instead of sending the voice directly from Vancouver to Seattle, it would go from Vancouver to Montreal, and then to Seattle.

Figure 2A:
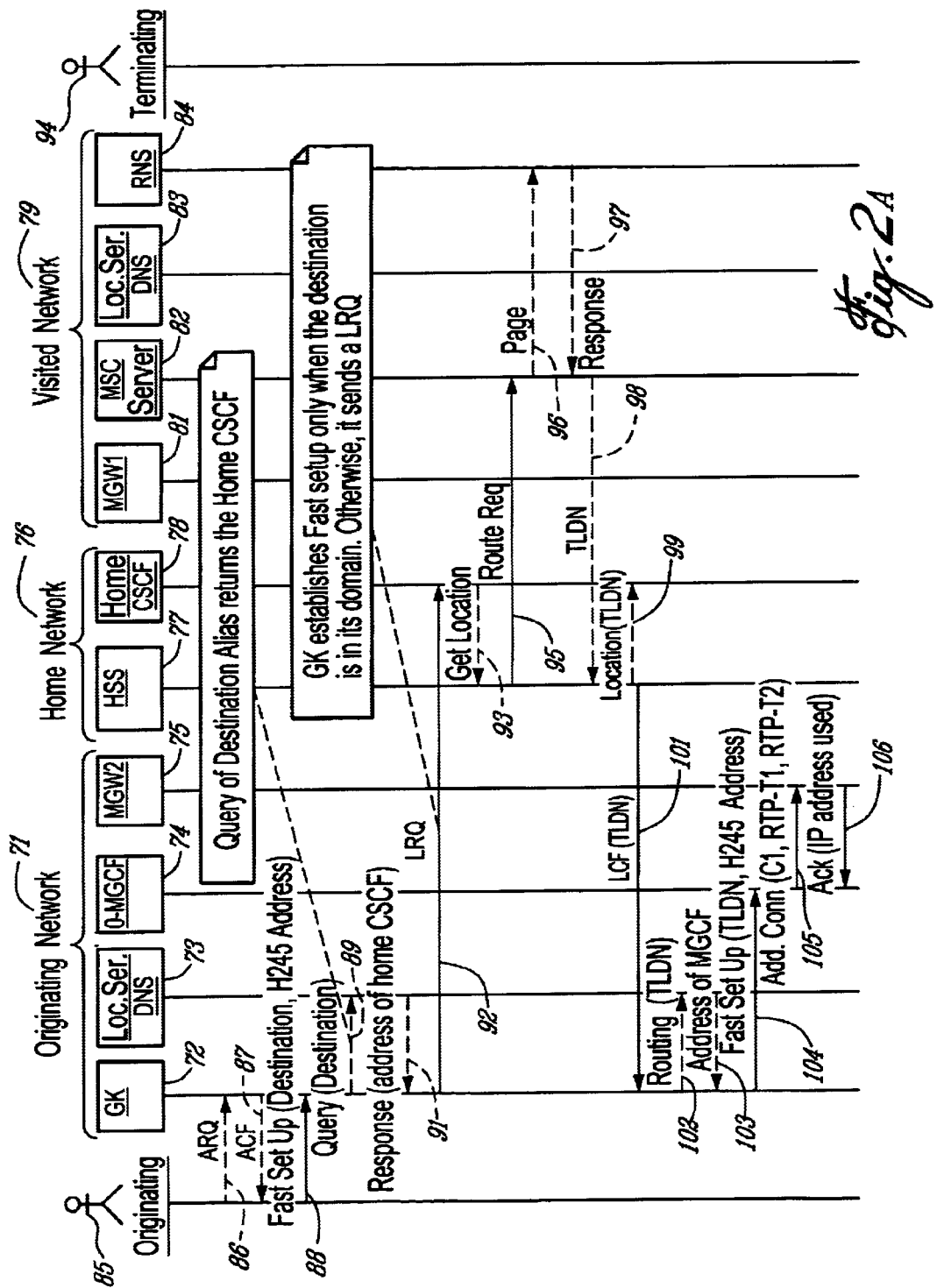
FIGS. 2A and 2B are two parts of a signaling diagram illustrating the more efficient flow of messages when routing a call to a roaming mobile subscriber using the method of the present invention.
Figure 2B:
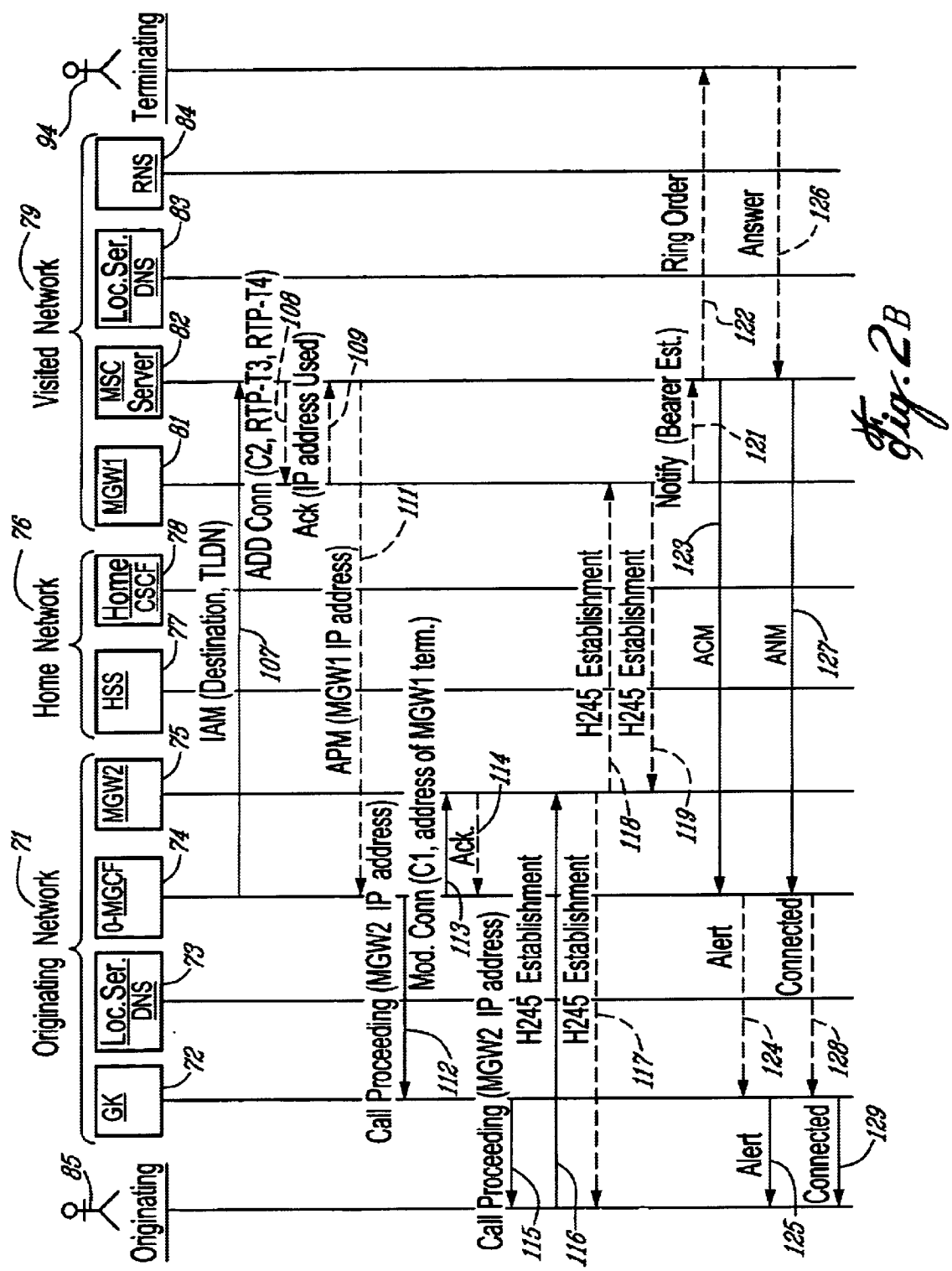

FIGS. 2A and 2B are two parts of a signaling diagram illustrating the more efficient flow of messages when routing a call to a roaming mobile subscriber using the method of the present invention. Once the location of the roaming subscriber is known, the present invention returns the IP address of the node where he is roaming, and then routes the call directly. An Originating Network 71 includes a Gatekeeper (GK) 72, a Location Server DNS 73, an Originating Media Gateway Control Function (O-MGCF) 74, and an Originating Media Gateway (MGW2) 75. A Home Network 76 includes a Home Subscriber Server (HSS) 77 and a Home Call State Control Function (CSCF) 78. A Visited Network 79 includes a Visited Media Gateway (MGW1) 81, a Mobile Switching Center (MSC) Server 82, a Location Server DNS 83, and a Radio Network Server (RNS) 84.

An originating subscriber 85 sends an ARQ message 86 to the Gatekeeper 72 which returns an ACF message 87 to the originating subscriber. The originating subscriber then sends a Fast Setup message 88, including the Destination Alias and the H.245 Address, to the Gatekeeper. At 89, the Gatekeeper sends a Query of the Destination Alias to the Location Server 73 in the Originating Network. This Query results in a Response to the Gatekeeper at 91 which indicates the address of the Home CSCF 78.

The Gatekeeper 72 then sends a Location Request (LRQ) message 92 to the Home CSCF 78 rather than sending a Fast Setup as was previously known. In the present invention, the Gatekeeper establishes a Fast Setup only when the destination is in its own domain. Otherwise, the Gatekeeper sends an LRQ message. At 93, the Home CSCF queries the HSS 77 to obtain location information for the called (terminating) subscriber 94. Therefore, the HSS sends a Routing Request (RouteReq) message 95 to the MSC Server 82 in the Visited Network 79. The MSC Server requests the RNS 84 to page for the mobile terminating subscriber at 96. The RNS returns a response at 97 indicating whether or not the mobile terminating subscriber is available. If the terminating subscriber is available, the MSC Server sends a routing number such as a TLDN to the HSS at 98. At 99, the HSS sends the TLDN to the Home CSCF.

The Home CSCF 78 then sends the TLDN to the Originating Network Gatekeeper 72 in a Location Confirm (LCF) message 101. The Gatekeeper then sends the TLDN to the Location Server DNS 73 in a Routing message 102. In response, the Location Server DNS returns the address of the O-MGCF 74. The Gatekeeper then sends a Fast Setup message 104 to the O-MGCF with an H.245 Address. The O-MGCF responds by sending an Add Connection message 105 to MGW2 75 and includes the H.248 parameters C1, RTP-T1, and RTP-T2. MGW2 then returns an Acknowledgment 106 with the IP address selected for use with this session. The process then moves to FIG. 2B, where the Originating Network 71 then begins to route the call directly to the Visited Network 79.

At 107, the O-MGCF 74 in the Originating Network 71 sends a call setup message such as an ISUP IAM message to the MSC Server 82 in the Visited Network 79. The IAM message includes the Destination Alias and the TLDN for the mobile terminating subscriber 94. The MSC Server responds by sending an Add Connection message 108 to MGW1 81, and includes the C2, RTP-T3, and RTP-T4 parameters. MGW1 then returns an Acknowledgment 109 with the IP address selected for use with this session. The MSC Server then sends an Application Transport Message (APM) 111 to the O-MGCF in the Originating Network 71 and includes the IP address of MGW1 81. The O-MGCF sends a Call Proceeding message 112 to the Gatekeeper 72 with the IP address of MGW2 75. The O-MGCF also sends a Modify Connection message 113, including C1 and the IP address of MGW1, to MGW2. At 114, MGW2 acknowledges the Modify Connection message. At 115, the Gatekeeper sends a Call Proceeding message, including the IP address of MGW2, to the originating subscriber 85.

This process results in the dissemination of IP addresses such that a call can be established from the originating subscriber 85 to the Originating Network 71, and from there directly to the Visited Network 79. Thus, an H.245 Establishment message 116 is sent from the originating subscriber to MGW2 75 in the Originating Network, and an Establishment Acknowledgment message 117 is returned to the originating subscriber. At 118, MGW2 sends an H.245 Establishment message to MGW1 81 in the Visited Network, and an Establishment Acknowledgment message 119 is returned to MGW2. At this point, MGW1 sends a Notify message 121 to the MSC Server 82 indicating that a bearer has been established.

The MSC Server 82 then sends a ring order 122 to the mobile terminating subscriber 94, and sends an ISUP ACM message 123 to the O-MGCF 74 in the Originating Network 71. The O-MGCF sends an Alert signal 124 to the Gatekeeper 72 which forwards the Alert signal to the originating subscriber at 125. When the mobile terminating subscriber answers the ring order, an Answer signal 126 is sent to the MSC Server in the Visited Network 79. The MSC Server sends an ISUP ANM message 127 to the O-MGCF. The O-MGCF then sends a Connected signal 128 to the Gatekeeper which forwards the Connected signal to the originating subscriber at 129.

Thus, in the case where the originating subscriber was located in Vancouver, the terminating subscriber's home network was in Montreal, and the terminating subscriber was roaming in Seattle, FIGS. 2A and 2B illustrate a methodology in which the gateway functionality remains in the home network in Montreal, but the payload follows an optimized path. This path originates in the originating subscriber's H.323 fixed terminal, crosses MGW2 in Vancouver to reach MGW1 in Seattle, and finally to the mobile terminating subscriber's 3G.IP terminal. Therefore the voice information goes directly from Vancouver to Seattle.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method in a third generation Internet Protocol (3G.IP) network of routing a call from an originating subscriber in an originating network to a mobile terminating subscriber roaming in a visited network, said mobile terminating subscriber having a home network that maintains location information for the mobile terminating subscriber, the visited network including a media gateway (MGW1) and a Mobile Switching Center (MSC) Server, and the originating network including a media gateway (MGW2) and an Originating Media Gateway Control Function (O-MGCF), said method comprising the steps of:

sending a call origination message from the originating subscriber to the originating network;

obtaining location information for the mobile terminating subscriber in the visited network, said location information being obtained by the originating network from the home network;

sending a call setup message from the originating network to the visited network, said call setup message being addressed to the location obtained for the mobile terminating subscriber in the visited network, and the step of sending a call setup message from the originating network to the visited network including sending an Initial Address Message (IAM) from the O-MGCF to the MSC Server and including a routing number for the mobile terminating subscriber;

sending from the visited network directly to the originating network, an IP address for a node serving the mobile terminating subscriber in the visited network; and routing the call directly from the originating network to the visited network.

2. A method in a third generation Internet Protocol (3G.IP) network of routing a call from an originating subscriber in an originating network to a mobile terminating subscriber roaming in a visited network, the originating network including a media gateway (MGW2), an Originating Media Gateway Control Function (O-MGCF), and a gatekeeper, the visited network including a media gateway (MGW1) and a Mobile Switching Center (MSC) Server, said mobile terminating subscriber having a home network that maintains location information for the mobile terminating subscriber, said method comprising the steps of:

sending a call origination message from the originating subscriber to the originating network;

receiving the call origination message from the originating subscriber at said gatekeeper;

obtaining location information for the mobile terminating subscriber in the visited network, said location information being obtained by the originating network from the home network, wherein the step of obtaining location information for the mobile terminating subscriber includes steps of:

requesting by the gatekeeper, a routing number for the mobile terminating subscriber;

obtaining the routing number by the home network; and sending the routing number to the gatekeeper in the originating network;

sending a call setup message from the originating network to the visited network, said call setup message being addressed to the location obtained for the mobile terminating subscriber in the visited network;

sending from the visited network directly to the originating network, an IP address for a node serving the mobile terminating subscriber in the visited network and an IP address of MGW1 from the MSC Server to the O-MGCF in response to the call setup message; and routing the call directly from the originating network to the visited network.

3. The method of routing a call from an originating subscriber to a mobile terminating subscriber in a 3G.IP network of claim 2 wherein the step of routing the call directly from the originating network to the visited network includes the steps of:

providing the IP address of MGW1 to MGW2;

providing an IP address of MGW2 to the originating subscriber; and routing the call from the originating subscriber to MGW2 in the originating network, and from MGW2 directly to MGW1 in the visited network.

4. A method in a third generation Internet Protocol (3G.IP) network of routing a call from an originating subscriber in an originating network to a mobile terminating subscriber roaming in a visited network, said mobile terminating subscriber having a home network that maintains location information for the mobile terminating subscriber, said method comprising the steps of:

sending a call origination message from the originating subscriber to a gatekeeper in the originating network;

obtaining by the gatekeeper, an address of a Home Call State Control Function (H-CSCF) in the home network for the mobile terminating subscriber;

determining by the gatekeeper that the H-CSCF is not in the gatekeeper's own domain;

sending a location request message from the gatekeeper to the H-CSCF;

requesting by the H-CSCF, a location for the mobile terminating subscriber from a Home Subscriber Server (HSS) in the home network;

requesting by the HSS, a routing number for the mobile terminating subscriber from a Mobile Switching Center (MSC) Server in the visited network;

sending the routing number from the MSC Server to the HSS;

sending the routing number from the HSS to the H-CSCF;

sending the routing number from the H-CSCF to the gatekeeper in the originating network;

sending an Initial Address Message (IAM) from an Originating Media Gateway Control Function (O-MGCF) in the originating network to the MSC Server in the visited network and including the routing number for the mobile terminating subscriber;

sending an IP address of a media gateway in the visited network (MGW1) from the MSC Server to the O-MGCF in response to the IAM;

providing the IP address of MGW1 directly to a media gateway in the originating network (MGW2);

providing an IP address of MGW2 to the originating subscriber; and routing the call from the originating subscriber to MGW2 in the originating network, and from MGW2 directly to MGW1 in the visited network.

* * * * *